(12) United States Patent
Wang et al.

(10) Patent No.: US 11,057,121 B2
(45) Date of Patent: Jul. 6, 2021

(54) DETERMINING A PROPAGATION CONDITION OF A WIRELESS CHANNEL

(71) Applicant: Cisco Technology, Inc., San Jose, CA (US)

(72) Inventors: Huaiyi Wang, North Royalton, OH (US); Zhigang Gao, Twinsburg, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 15 days.

(21) Appl. No.: 16/564,984

(22) Filed: Sep. 9, 2019

(65) Prior Publication Data
US 2021/0075523 A1 Mar. 11, 2021

(51) Int. Cl.
| | | |
|---|---|---|
| H04B 17/12 | (2015.01) | |
| H04W 64/00 | (2009.01) | |
| H04L 5/00 | (2006.01) | |
| H04W 24/02 | (2009.01) | |
| H04B 17/391 | (2015.01) | |

(52) U.S. Cl.
CPC ........... *H04B 17/12* (2015.01); *H04L 5/0007* (2013.01); *H04W 24/02* (2013.01); *H04W 64/006* (2013.01); *H04B 17/3911* (2015.01)

(58) Field of Classification Search
None
See application file for complete search history.

(56) References Cited

U.S. PATENT DOCUMENTS

| | | | |
|---|---|---|---|
| 8,971,380 B2 | 3/2015 | Forenza et al. | |
| 2011/0293040 A1* | 12/2011 | Dupont | H04L 27/2684 375/316 |

(Continued)

FOREIGN PATENT DOCUMENTS

WO WO 20191029822 A1 2/2019

OTHER PUBLICATIONS

IEEE P802,11ax™/d4.0; *Draft Standard for Informational Technology—Telecommunications and Information Exchange between Systems Local and Metropolitan Area Networks—Specific Requirements*, © 2019 IEEE, Feb. 2019, cover page and pp. 432, 433 and 443-445), Feb. 2019.

(Continued)

*Primary Examiner* — Jutai Kao
(74) *Attorney, Agent, or Firm* — Baker Botts, LLP (57) ABSTRACT

In some embodiments, a method obtains raw data from one or more packets received over a wireless channel via an antenna. The raw data comprises raw amplitude values and raw phase values. Each raw amplitude value and raw phase value corresponds to a respective OFDM symbol and subcarrier of a respective packet. The method further comprises processing the raw data according to an interference mitigation process and using the resulting calibrated amplitude values and calibrated phase values to determine weighted phase values. Each weighted phase value corresponds to a respective subcarrier. The method determines a phase variance for the antenna based on comparing the plurality of weighted phase values across the plurality of subcarriers. The method determines whether the wireless channel experiences line-of-sight propagation or non-line-of-sight propagation based at least in part on the phase variance.

20 Claims, 6 Drawing Sheets

(56) References Cited

U.S. PATENT DOCUMENTS

2019/0020530 A1    1/2019    Au et al.
2020/0096599 A1*    3/2020    Hewett .............. G06K 7/10465

OTHER PUBLICATIONS

*Lifi: Line-Of-Sight Identification with WiFi*, Zimo Zhou et al., IEEE INFOCOM 2014—IEEE Conference on Computer Communications, 2014.

*PhaseU: Real-time LOS Identification with WiFi*, Chenshu Wu et al., 2015 IEEE Conference on Computer Communications (INFOCOM), 2015.

*Non-Line-of-Sight Identification and Mitigation Using Received Signal Strength*, Zhuoling Xiao et al., IEEE Transactions on Wireless Communications, vol. 14, No. 3, pp. 1689-1702.

*NLOS Identification and Weighted Least-Squares Localization for UWB Systems Using Multipath Channel Statistics*, Ismail Guvenc et al., Hindawl Publishing Corporation, EURASIP Journal on Advances in Signal Processing, vol. 2008, Article ID 271984.

\* cited by examiner

DETERMINING A PROPAGATION CONDITION OF A WIRELESS CHANNEL

TECHNICAL FIELD

The present disclosure relates generally to determining a propagation condition of a wireless channel.

BACKGROUND

In a wireless communications system, an access point (AP) may communicate with a station (STA) over a wireless communications channel. Communication may be line-of-sight (LOS) or non-line-of-sight (NLOS). LOS communication occurs when there is no obstruction between the AP and the STA. NLOS communication occurs when natural and/or man-made structures block the path between the AP and the STA. NLOS signals reach the receiver after passing through the obstruction or reflecting off of the obstruction, thus taking an indirect path to the receiver. As a result, NLOS signals tend to be more susceptible to attenuation and interference (e.g., multipath fading, inter-symbol interference, inter-carrier interference) than LOS signals.

DESCRIPTION OF EXAMPLE EMBODIMENTS

Overview

In some embodiments, a method obtains raw data from one or more packets received over a wireless channel via an antenna. The raw data comprises raw amplitude values and raw phase values. Each raw amplitude value and raw phase value corresponds to a respective OFDM symbol and sub-carrier of a respective packet. The method further comprises processing the raw data according to an interference mitigation process and using the resulting calibrated amplitude values and calibrated phase values to determine weighted phase values. Each weighted phase value corresponds to a respective subcarrier. The method determines a phase variance for the antenna based on comparing the plurality of weighted phase values across the plurality of subcarriers. The method determines whether the wireless channel experiences line-of-sight propagation or non-line-of-sight propagation based at least in part on the phase variance.

Example Embodiments

An AP may use location determination procedures to determine the geographical location of an STA. Location determination procedures may be time-based, such as time-of-arrival (ToA), time-of-flight (ToF), and differential round trip time (DRTT) procedures. Location determination procedures may be angle-based, such as angle-of-arrival (AoA). Regardless of the type of location determination procedure, multipath propagation in the wireless environment impacts the accuracy of the location determination procedure. However, many mainstream location determination algorithms assume a LOS propagation scenario. These mainstream location determination algorithms lack accuracy because in many real applications, the LOS signals either do not exist or are super-positioned with NLOS signals of similar power level. Certain embodiments of the present disclosure provide solutions to overcome this practical difficulty in location determination. Certain embodiments allow for accurately determining a LOS or NLOS propagation scenario in a timely manner. The result of the LOS or NLOS determination is then use as an input to a location determination procedure to help with algorithm selection and/or parameter tuning.

Certain embodiments can identify the propagation scenario (LOS or NLOS) of uplink WiFi signals received by an AP configured with multiple antennas. The result of the LOS or NLOS determination is then use as an input to a location determination procedure to help with algorithm selection and/or parameter tuning. As a result, the location accuracy may be improved. Additionally, in certain embodiments, the improvement in location accuracy can be achieved without overhauling the location algorithm itself. For example, the LOS or NLOS determination may be used as part of location procedures that are based on ToA, AoA, RSSI, etc. Certain embodiments may allow for using such location determination procedures in demanding location use cases, such as for locating Internet-of-Things (IoT) devices. Certain embodiments may be well-suited for use in 802.11ax (WiFi 6), which is expected to provide robust support for IoT devices.

Figure 1:
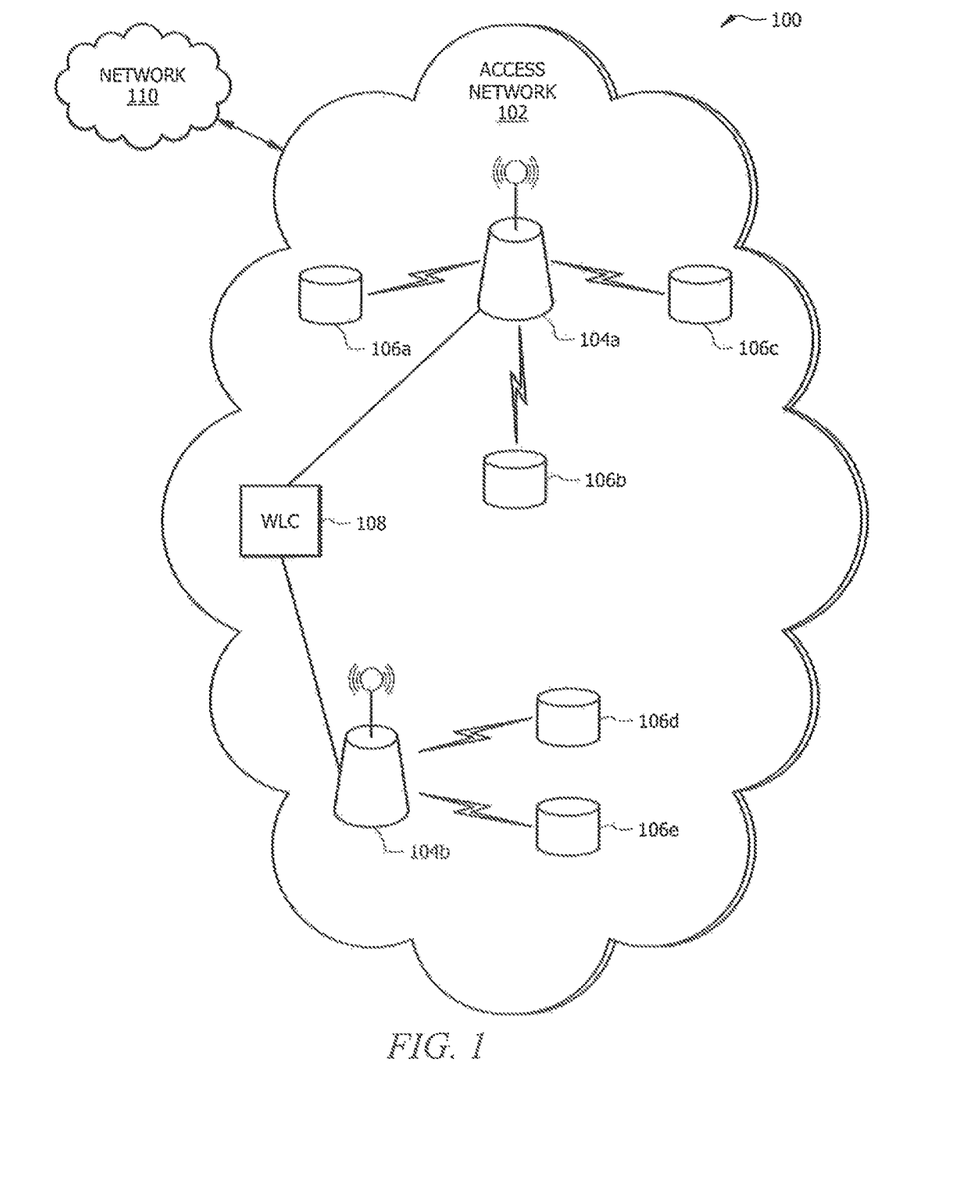
FIG. 1 is a block diagram illustrating an example of a system, according to certain embodiments.

FIG. 1 is a block diagram illustrating an example of a system 100, in accordance with certain embodiments. In the example illustrated in FIG. 1, system 100 includes an access network 102 and a network 110. Access network 102 includes a plurality of access points (APs) 104 in communication with a plurality of stations (STAs) 106. An AP 104 provides a communication interface between a STA 106 and network 110. In the embodiment illustrated in FIG. 1, AP 104*a* communicates with STAs 106*a*, 106*b*, and 106*c*, and AP 104*b* communicates with STAs 106*d* and 106*e*. More generally, any STA 106 is capable of communicating with any AP 104, provided that the STA 106 is within the coverage area and authorized to communicate with a given AP 104. Communication between AP 104 and STA 106 may include downlink and/or uplink communications via a wireless communication channel. For downlink communications, AP 104 acts as a transmitter and STA 106 acts as a receiver. For uplink communications, AP 104 acts as a receiver and STA 106 acts as a transmitter. Optionally, access network 102 includes a wireless local area network controller (WLC) 108 operable to manage multiple APs 104. For example, WLC 108 may manage the administration and configuration of APs 104.

In some embodiments, access network 102 may comprise a Wi-Fi network, which may be based on an Institute of Electrical and Electronic Engineers (IEEE) 802.11 specification, such as an IEEE 802.11ax. Examples of AP 104 include a femtocell, a hotspot, a picocell, a small cell, a WiFi array, or any other suitable access device, which may be capable of providing suitable connectivity to a wireless device. In certain cases, the access point connects to a router (via a wired network), and it can relay data between the wireless devices and wired devices of the network (e.g., network 110). Examples of STA 106 (which may also be referred to as "user equipment," "endpoint," or "wireless device") include a computer, a personal digital assistant (PDA), a laptop, an electronic notebook, a smartphone, an Internet-of-Things (IoT) device, or any other device, component, element, or object capable of sending or receiving data (e.g., voice, audio, video, media) within system 100. In some embodiments, network 110 may comprise all or a portion of a wireless network, a public switched telephone network (PSTN), an Internet, a public or private data network, a metropolitan area network (MAN), a wide area network (WAN), a local, regional, or global communication network, and/or a local, regional, or global computer network. Modifications, additions, or omissions may be made to system 100. The components of system 100 may be integrated or separated. For example, certain functionality of WLC 108 may be integrated in AP 104. Moreover, the operations of system 100 may be performed by more, fewer, or other components.

Figure 2:
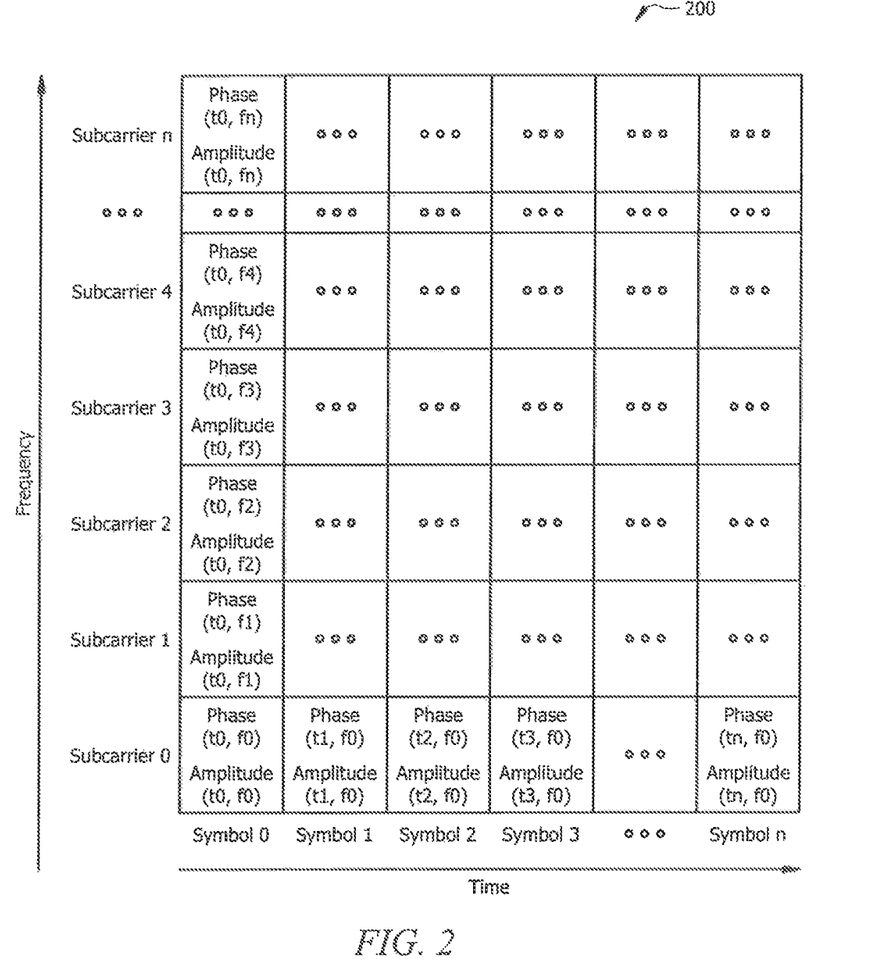
FIG. 2 is a block diagram illustrating an example of time-frequency resources of a packet, according to certain embodiments.

FIG. 2 illustrates an example of time-frequency resources used by a packet. Each time-frequency resource has a time component, illustrated by orthogonal frequency division multiplexing (OFDM) symbols 0-n, and a frequency component, illustrated by subcarriers 0-n. Different time-frequency resources may receive a signal at a different phase or amplitude. For example, a signal received over a frequency affected by multipath fading may tend to have greater variance for the phase rotation and/or amplitude across subcarriers than a signal received over a frequency that is not affected by multipath fading. As further discussed with respect to FIG. 3, the phase and amplitude properties may be used in determining whether a wireless channel is experiencing LOS or NLOS propagation.

Figure 3:
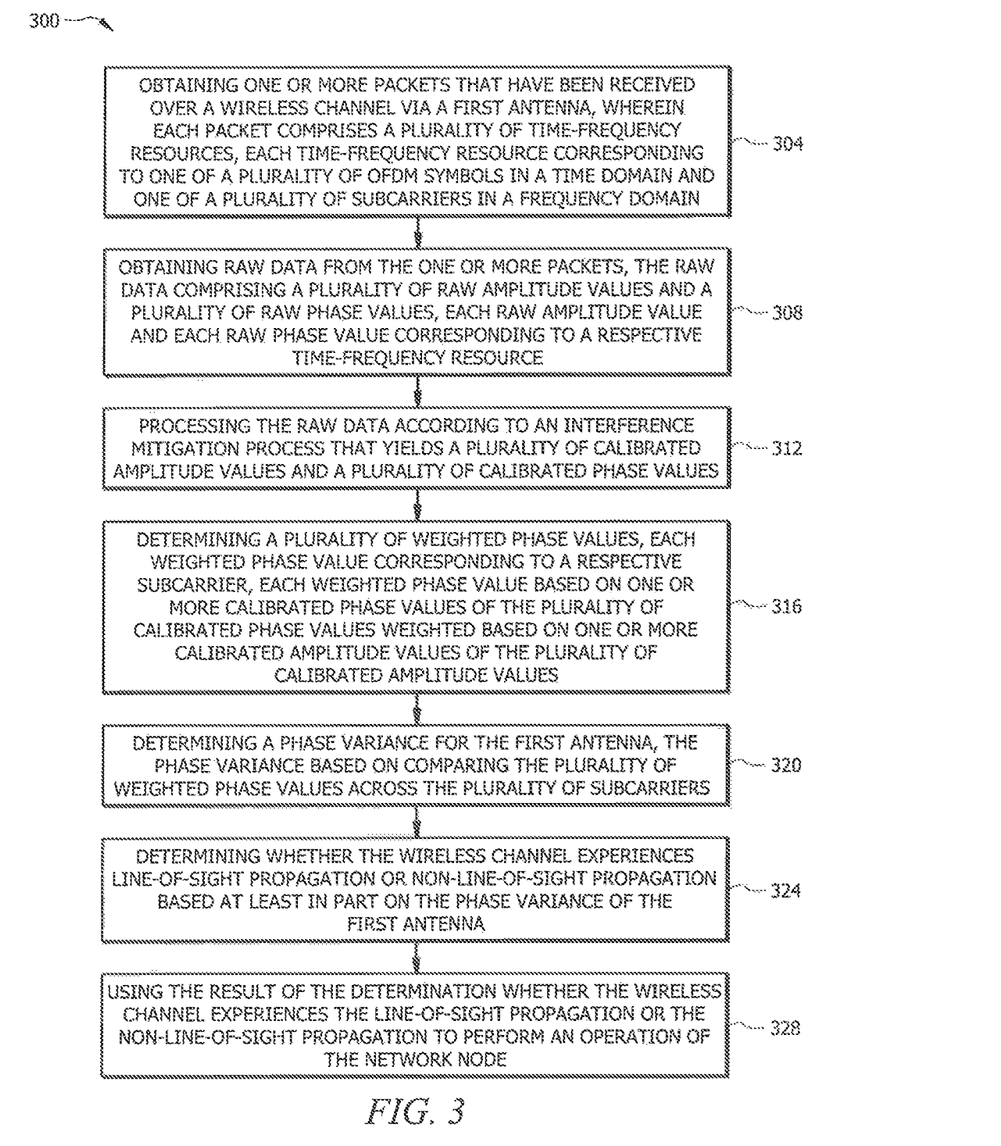
FIG. 3 is a flow diagram illustrating an example of a method for determining a propagation condition of a wireless channel, according to certain embodiments.

FIG. 3 is a flow diagram illustrating an example of a method for determining a propagation condition of a wireless channel, according to certain embodiments. In general, the method may be performed by a network node, such as AP 104, WLC 108, or another node within access network 102 or network 110 of FIG. 1. In an embodiment, the method may be performed by a network node that comprises or interfaces with components for performing a location determination procedure to locate STA 106.

In certain embodiments, the method may be based on certain assumptions. On lower-level PHY, time domain features (delay taps) of the multipath channel can be revealed by the fine-grained OFDM subcarriers in terms of their amplitude and phase variation. In a rich scattering environment, signals received at each antenna are expected to be uncorrelated as long as the antenna element spacing is no smaller than half of wavelength. The temporal characteristics of the multipath channel over the OFDM symbols in one WiFi packet are assumed to be highly correlated (or constant over time). Both receiver imperfections and synchronization errors contribute to the amplitude and phase variation of each subcarrier. Certain embodiments assume that each stage of the receiver properly performs the time and frequency synchronization.

The method begins at step 304 with obtaining one or more packets that have been received over a wireless channel via a first antenna of AP 104. As an example, the first antenna may be any one of a number (n) of antennas configured for AP 104. Step 304 may be performed by processing circuitry of AP 104 that obtains the one or more packets from the antenna. Alternatively, if the method is being performed by another network node (e.g., WLC 108 or a location determining platform located elsewhere in the network), the one or more packets may be obtained via AP 104 (e.g., AP 104 may receive one or more packets via the first antenna and may communicate the one or more packets to another network node via a network interface). Each packet comprises a plurality of time-frequency resources. Each time-frequency resource corresponds to an OFDM symbol in the time domain and a subcarrier in the frequency domain. See FIG. 2 for an example of time-frequency resources.

At step 308, the method obtains raw data from the one or more packets. The raw data comprising a plurality of raw amplitude values and a plurality of raw phase values. Each raw amplitude value and each raw phase value corresponds to a respective time-frequency resource. FIG. 2 illustrates an example in which OFDM symbol 0 has an associated raw amplitude value and raw phase value for subcarrier 0 (t0, f0), a raw amplitude value and raw phase value for subcarrier 1 (t0, f1), a raw amplitude value and raw phase value for subcarrier 2 (t0, f2), and so on. Similarly, OFDM symbol 1 has an associated raw amplitude value and raw phase value for subcarrier 0 (t1, f0), a raw amplitude value and raw phase value for subcarrier 1 (t1, f1), a raw amplitude value and raw phase value for subcarrier 2 (t1, f2), and so on. Similarly, the other OFDM symbols are each associated with a respective raw amplitude value and raw phase value. In certain embodiments, the raw data is obtained using channel state information (CSI). As further discussed below with respect to FIG. 5, CSI can be obtained directly for OFDM symbols that carry CSI. CSI can be derived from other information for OFDM symbols that do not carry CSI. In certain embodiments, processing is performed jointly for all the antennas to obtain the raw data for each antenna.

At step 312, the method processes the raw data according to an interference mitigation process that yields a plurality of calibrated amplitude values and a plurality of calibrated phase values. Examples of techniques that can be included in an interference mitigation process are further described below with respect to FIG. 6. The interference mitigation process may be performed for each raw amplitude value and each raw phase value obtained in step 308. Alternatively, the interference mitigation process may be performed for a subset comprising fewer than all of the raw amplitude values and raw phase values. As an example, certain embodiments may use a smaller sample size, which may allow for faster processing time, and other embodiments may use a larger sample size, which may allow for improved accuracy. The interference mitigation process should be applied at least to the raw amplitude values and raw phase values being used to provide an input to the next step of the method. In certain embodiments, the interference mitigation process may be applied to a subset of raw data that has been integrated over a period of time.

At step 316, the method determines a plurality of weighted phase values. Each weighted phase value corresponds to a respective subcarrier, and the method uses the plurality of calibrated amplitude values and the plurality of calibrated phase values from step 312 to determine the plurality of weighted phase values. In certain embodiments, each weighted phase value is determined at least in part by weighting a first value (such as a value based on one or more of the calibrated phase values corresponding to the respective subcarrier) by a second value (such as a value based on one or more of the calibrated amplitude values). That is, because the phases of subcarriers with smaller amplitudes are more prone to be disturbed, certain embodiments may improve accuracy by properly weighting the phase rotation of each subcarrier before calculating the phase variance in step 320. In certain embodiments, to determine the weighted phase values in step 316, the calibrated phase values will first be weighted with the corresponding calibrated amplitude values, and then be weighted by an amplitude variation (e.g., single value scalar) across the subcarriers, wherein the amplitude variation may be based on the calibrated amplitude values across the subcarriers. That is, because the phases of signals with greater amplitude variation are more prone to be disturbed, certain embodiments may improve accuracy by properly weighting the phase rotation based on amplitude variation across the subcarriers. The weighting may be performed before calculating the phase variance in step 320.

The calibrated amplitude values and calibrated phase values indicate temporal characteristics of the wireless channel. The calibrated amplitude values and calibrated phase values over subcarriers (e.g., subcarriers $0$-$n$) in one OFDM symbol (e.g., any one of OFDM symbol $0, 1, 2 \ldots$ or $n$) could be a good indicator of the channel propagation condition in certain embodiments. Thus, in certain embodiments, the one or more calibrated phase values and the one or more calibrated amplitude values used in determining the weighted phase value for the respective subcarrier are obtained from a single OFDM symbol.

In other embodiments, the values could be integrated over time to suppress the random phase perturbation so as to get a better discrimination between LOS and NLOS propagation. For example, in certain embodiments, the one or more calibrated phase values and the one or more calibrated amplitude values used in determining the weighted phase value for the respective subcarrier are obtained from a subset of OFDM symbols within the same packet of the one or more packets. As an example, in certain embodiments, the calibrated amplitude values for a subcarrier may be integrated over the subset of OFDM symbols. Similarly, the calibrated phase values for a subcarrier may be integrated over the subset of OFDM symbols. The integrated values may be used to determine the weighted phase value for the respective subcarrier.

Alternatively, in certain embodiments, the one or more calibrated phase values and the one or more calibrated amplitude values used in determining the weighted phase value for the respective subcarrier are obtained from multiple packets (e.g., at least two of the packets). As an example, in certain embodiments, the calibrated amplitude values for a subcarrier may be integrated over multiple packets. Similarly, the calibrated phase values for a subcarrier may be integrated over multiple packets. The integrated values may be used to determine the weighted phase value for the respective subcarrier.

At step 320, the method determines a phase variance for the first antenna. The phase variance is based on comparing the plurality of weighted phase values across the plurality of subcarriers.

At step 324, the method determines whether the wireless channel experiences LOS propagation or NLOS propagation based at least in part on the phase variance of the first antenna. The method may identify LOS propagation when the power of the LOS path is relative strong compared to the power of the NLOS paths. The method may identify NLOS propagation when the power of the LOS path is similar to or much smaller than that of the NLOS paths.

In certain embodiments, steps 304-320 are also performed for the other antennas of AP 104. Thus, the method obtains a phase variance for each of a number (n) of antennas. The method determines whether the wireless channel experiences LOS propagation or NLOS propagation based on how many of the (n) antennas have a phase variance that exceeds a detection threshold. For example, suppose the detection threshold is set to X. A phase variance greater than X may indicate a high presence of NLOS propagation for that antenna, and a phase variance less than X may indicate a low presence of NLOS propagation (therefore, LOS propagation) for that antenna.

Another threshold may be used to determine the overall LOS or NLOS decision for AP 104 based on how many of AP 104's antennas indicate NLOS propagation. The threshold may be used to evaluate any suitable criteria, such as a total number of antennas indicating NLOS or a ratio of antennas indicating NLOS. For example, if the phase variances of m-out-of-n antennas are greater than the predefined detection threshold, the determination provides an NLOS result, otherwise the determination provides a LOS result.

In summary, in certain embodiments, a method comprises determining a phase variance for each antenna of a plurality antennas. For each antenna, the method comprises obtaining one or more packets that have been received over a wireless channel via the respective antenna. Each packet comprises a plurality of time-frequency resources. Each time-frequency resource corresponds to one of a plurality of OFDM symbols in a time domain and one of a plurality of subcarriers in a frequency domain. The method further comprises obtaining raw data from the one or more packets. Processing may be performed jointly for all the antennas to obtain the raw data for each antenna. The raw data comprises a plurality of raw amplitude values and a plurality of raw phase values. Each raw amplitude value and each raw phase value corresponds to a respective time-frequency resource. The method further comprises processing the raw data according to an interference mitigation process that yields a plurality of calibrated amplitude values and a plurality of calibrated phase values. The method further comprises determining a plurality of weighted phase values. Each weighted phase value corresponds to a respective subcarrier. Each weighted phase value is based on one or more calibrated phase values of the plurality of calibrated phase values weighted based on one or more calibrated amplitude values of the plurality of calibrated amplitude values. In certain embodiments, the calibrated phase values will first be weighted with the corresponding calibrated amplitude values, and then be weighted by an amplitude variation determined from the calibrated amplitude values across the subcarriers. The method further comprises determining the phase variance for the respective antenna based on comparing the plurality of weighted phase values across the plurality of subcarriers. After determining the phase variances for the plurality of antennas, the method further comprises determining whether the wireless channel experiences LOS or NLOS propagation based at least in part on the phase variances of the plurality of antennas. For example, if at least (m) of (n) antennas each have a phase variance that exceeds a pre-determined threshold, the method may determine that the wireless channel experiences NLOS propagation.

In certain embodiments, the LOS/NLOS determination may be based in part on a Rician K factor. For example, the Rician K factor may be used to set a threshold used in the LOS/NLOS determination. In an embodiment, the Rician K factor may be used to set a threshold used in analyzing whether a phase variance indicates LOS or NLOS propagation. As one example, thresholds may be set in a way that allow for a greater margin of error for Rician K factors under which a system configuration has a higher likelihood of accurately identifying LOS vs. NLOS propagation, whereas thresholds may be set in a way that require a lower margin of error for Rician K factors under which the same system configuration has a lower likelihood of accurately identifying LOS vs. NLOS propagation. In one embodiment, WLAN channel model F (Rician K factor 6 dB) may have a higher likelihood of accurately identifying LOS vs. NLOS propagation than WLAN channel model D (Rician K factor 3 dB).

At step 328, the method uses the result of the determination whether the wireless channel experiences the LOS propagation or NLOS propagation to perform an operation of the network node. In certain embodiments, the operation comprises providing the LOS/NLOS propagation result as an input to a location determination procedure. The location determination procedure may then determine the algorithm and/or parameters for locating STA 106 based on the LOS or NLOS result. The location determination procedure is then performed according to the determined algorithm and/or parameters in order to determine the location of STA 106.

For purposes of example and explanation, the following paragraphs describe a simple embodiment based on applying steps of FIG. 3 for symbol 0 of the packet shown in FIG. 2.

At step 304, the method obtains the packet shown in FIG. 3.

At step 308, the method obtains raw amplitude values ("RAVs") and raw phase values ("RPVs"). For purposes of the example, suppose the raw amplitude values for symbol 0 correspond to RAV-0 for subcarrier 0, RAV-1 for subcarrier 1, RAV-2 for subcarrier 2, RAV-3 for subcarrier 3, RAV-4 for subcarrier 4, and so on to RAV-n for subcarrier n. Suppose raw phase values for symbol 0 correspond to RPV-0 for subcarrier 0, RPV-1 for subcarrier 1, RPV-2 for subcarrier 2, RPV-3 for subcarrier 3, RPV-4 for subcarrier 4, and so on to RPV-n for subcarrier n.

At step 312, the method processes the raw data according to an interference mitigation process that yields calibrated amplitude values ("CAVs") and calibrated phase values ("CPVs"). For purposes of the example, suppose that processing RAV-0 yields CAV-0 for subcarrier 0, processing RAV-1 yields CAV-1 for subcarrier 1, processing RAV-2 yields CAV-2 for subcarrier 2, processing RAV-3 yields CAV-3 for subcarrier 3, processing RAV-4 yields CAV-4 for subcarrier 4, and so on. Suppose processing RPV-0 yields CPV-0 for subcarrier 0, processing RPV-1 yields CPV-1 for subcarrier 1, processing RPV-2 yields CPV-2 for subcarrier 2, processing RPV-3 yields CPV-3 for subcarrier 3, processing RPV-4 yields CPV-4 for subcarrier 4, and so on. In certain embodiments, an amplitude variation value ("AVV") across subcarriers 0-$n$ may be determined by calculating a variation across CAV-0 to CAV-n.

At step 316, the method determines a plurality of weighted phase values ("WPVs") based on the calibrated amplitude values and the calibrated phase values. For purposes of example, suppose that CPV-0 is weighted based on CAV-0 (i.e., the calibrated amplitude value corresponding to the same time-frequency resources as CPV-0) and AVV to obtain WPV-0 for subcarrier 0, CPV-1 is weighted based on CAV-1 and AVV to obtain WPV-1 for subcarrier 1, CPV-2 is weighted based on CAV-2 and AVV to obtain WPV-2 for subcarrier 2, CPV-3 is weighted based on CAV-3 and AVV to obtain WPV-3 for subcarrier 3, CPV-4 is weighted based on CAV-4 and AVV to obtain WPV-4 for subcarrier 4, and so on. Because the phases of subcarriers with smaller amplitudes are more prone to be disturbed, weighting the phase values based on the amplitude values may ensure that the phases of subcarriers with smaller amplitudes do not disproportionately affect the phase variance determined in the next step. Similarly, because the phases of signals with larger amplitude variations across the subcarriers are more prone to be disturbed, weighting the phase values based on the amplitude variation values may ensure that the signals with larger amplitude variations do not disproportionately affect the phase variance determined in the next step.

At step 320, the method determines the phase variance based on comparing the weighted phase values across the plurality of subcarriers. In the example based on symbol 0 of the packet illustrated in FIG. 2, the method compares WPV-0, WPV-1, WPV-2, WPV-3, WPV-4, and so on through WPV-n to determine the phase variance. The method may then use the phase variance in performing steps 324 and 328, discussed above.

Modifications, additions, or omissions may be made to the method of FIG. 3. The method may include more, fewer, or other steps. Additionally, steps may be performed in any suitable order. In certain embodiments, the method described with respect to FIG. 3 may be implemented using a computer program comprising executable instructions stored in a non-transitory computer-readable storage medium. The instructions, when executed by processing circuitry, cause the processing circuitry to perform the steps of FIG. 3. Examples of processing circuitry and a non-transitory computer-readable storage medium are described below with respect to FIG. 4 (e.g., processing circuitry 420 and memory 430, respectively).

Figure 4:
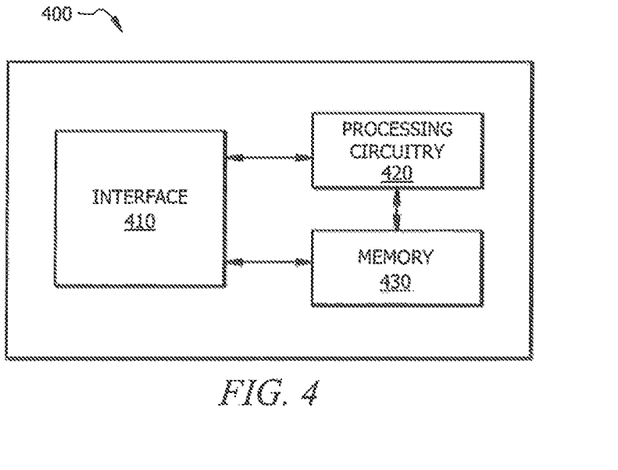
FIG. 4 is a block diagram illustrating example components of a network node, such as an access point, or a station, according to certain embodiments.

FIG. 4 is a block diagram illustrating example circuitry, according to certain embodiments. The circuitry illustrated in FIG. 4 may be used to implement any suitable device, such as a network node (e.g., AP 104, WLC 108, or a node within network 102 or 110 of FIG. 1) or STA 106. The circuitry illustrated in FIG. 4 comprises one or more interfaces 410, processing circuitry 420, and memory 430. In general, an interface 410 receives input and provides output to facilitate communication between devices or components, processing circuitry 420 executes program code to perform the functionality of the device, and memory 430 stores information.

Examples of an interface 410 may include an internal bus or other circuitry to communicate data between components within the device, a wireless interface (which may include a transmitter to transmit wireless signals and a receiver to receive wireless signals), and/or a network interface (which may include a wired or wireless interface to communicate with switches, routers, or other components of a network). An interface 410 may be configured to use any suitable type of communication protocol and may comprise any suitable protocol converter, modem, and/or other logic to receive an input and provide an output.

Processing circuitry 420 comprises any electronic circuitry including, but not limited to, one or more processors, microprocessors, microcontrollers, central processing unit (CPU) chips, state machines, logic units, cores (e.g. a multi-core processor), field-programmable gate array (FPGAs), application specific integrated circuits (ASICs), digital hardware, digital signal processors (DSPs), special-purpose digital logic, any suitable hardware and/or software for processing data, or a combination of the preceding. Processing circuitry 420 may be configured to execute program code stored in memory 430, which may include one or several types of memory such as read-only memory (ROM), random-access memory (RAM), cache memory, flash memory devices, optical storage devices, non-transitory computer readable media, etc. Program code stored in memory may include instructions (such as logic, rules, etc.) for executing one or more telecommunications and/or data communications protocols as well as instructions for carrying out one or more of the techniques described herein.

In certain embodiments, memory 430 of a network node (e.g., AP 104, WLC 108, or another node within network 102 or 110 of FIG. 1) may store program code comprising instructions for determining a propagation condition of a wireless channel, for example, according to the steps of FIG. 3. In certain embodiments, memory 430 of a network node (e.g., AP 104, WLC 108, or another node within network 102 or 110 of FIG. 1) may store program code comprising instructions for determining a location of STA 106 based in part on the propagation condition of the wireless channel. For example, the instructions may indicate an algorithm or parameters to use in a location determination procedure depending on whether the propagation condition is determined to be LOS or NLOS.

Modifications, additions, or omissions may be made to the circuitry shown in FIG. 4. The components of a device may be integrated or separated. Moreover, the functionality of a device may be performed by more, fewer, or other components. The components within a device may be communicatively coupled in any suitable manner. Functionality described herein may be performed by one device or distributed across multiple devices.

Figure 5:
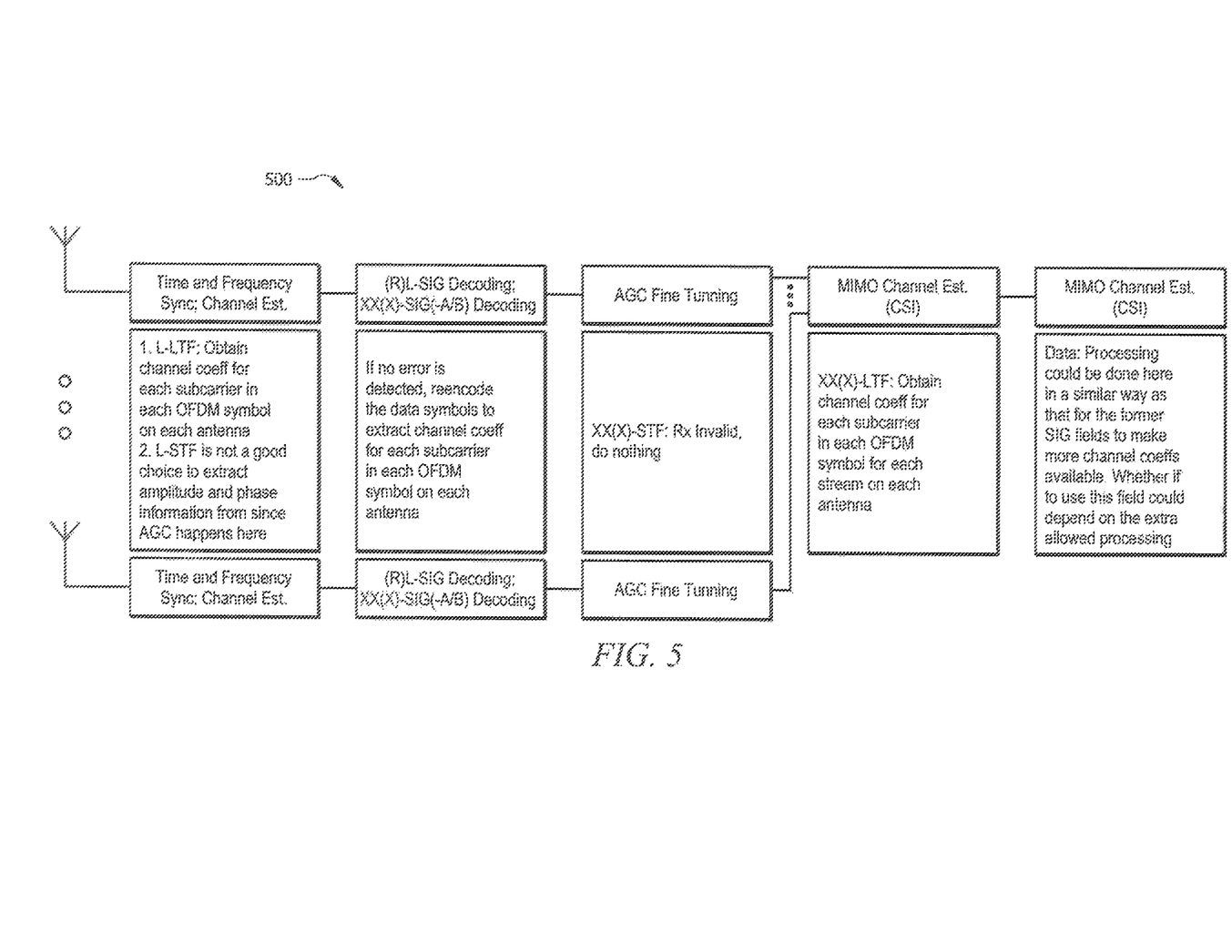
FIG. 5 is a flow diagram illustrating an example method for determining raw data, according to certain embodiments.

FIG. 5 is a flow diagram illustrating an example method for determining raw data, according to certain embodiments. In certain embodiments, the method of FIG. 5 may be used to obtain the raw data described with respect to step 308 of FIG. 3. As a rule of thumb for acquiring raw amplitude values and raw phase values, certain embodiments make use of all the available information about the wireless channel to derive its temporal characteristics. For general Physical Layer Convergence Procedure Protocol Data Unit (PPDU) fields that are used for channel estimation, the reported channel state information (CSI) may be directly utilized. For other fields that carry control and data bits, the method may first save the pre-equalized data symbols, decode these fields, and run cyclic redundancy checks (CRCs) to make sure the decoded bits are correct. The method can then reencode these bits to generate the genie data symbol as the local reference and use the saved pre-equalized data symbols to derive the CSI for these OFDM symbols.

Figure 6:
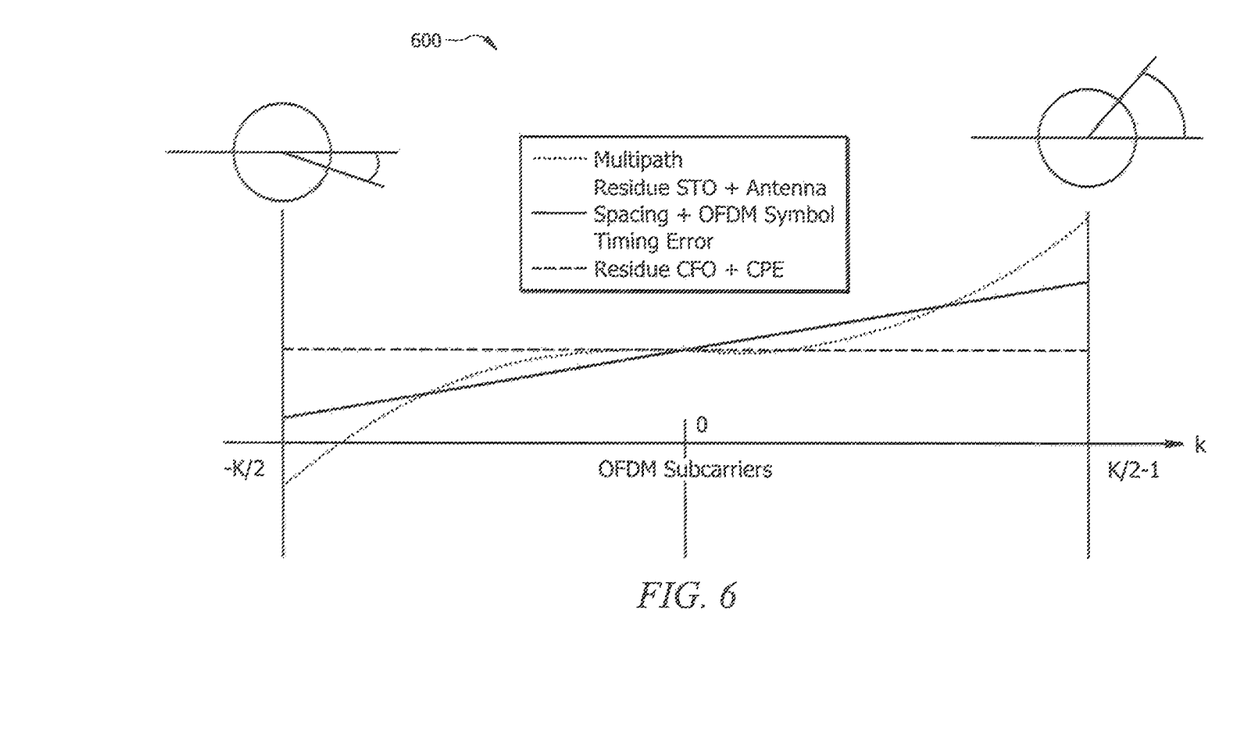
FIG. 6 is a diagram illustrating examples of errors that may be mitigated by an interference mitigation process, according to certain embodiments.

FIG. 6 is a diagram illustrating examples of errors that may be mitigated by an interference mitigation process, according to certain embodiments. It is expected that the CSIs derived from each OFDM symbol should highly agree with each other. However, due phase noise, thermal noise, time synchronization error, and frequency synchronization error at the receiver, the measured amplitude and phase will inevitably be disturbed and offset. For example, the thermal noise and phase noise will introduce random amplitude and phase perturbation to the true amplitude and phase variation resulting from the multipath channel. The time synchronization will cause linear phase accumulation over the consecutive subcarriers in an OFDM symbol. The frequency synchronization error could cause the offset of subcarriers and this will also add variations to the true amplitude and phase values. Amplitude and phase variations from multiple sources are shown in FIG. 6. Here the perturbation due to noise is not shown in the plot.

An interference mitigation process, such as described with respect to step 312 of FIG. 3, may be used to calibrate the raw amplitude and phase values by removing or reducing errors/interference, such as phase noise, thermal noise, time synchronization error, and frequency synchronization error, etc. For example, the interference mitigation process may remove or mitigate random perturbation resulting from thermal noise and phase noise by integration over time and different antennas. The interference mitigation process may include pilot tracking or a simple linear regression to remove or mitigate phase accumulation over subcarriers in the frequency domain resulting from the time synchronization error. The interference mitigation process may use constant phase removal to remove or mitigate measurement errors resulting from the frequency synchronization error.

Certain embodiments disclosed herein may provide one or more technical advantages. As an example, certain methods disclosed herein determine a propagation condition of the wireless channel from raw data obtained from one single packet (or from a limited number of OFDM symbols in this packet), which may allow for making a LOS vs. NLOS determination with little processing latency. As another example, certain embodiments are designed to work with a single packet, which makes such embodiments more appropriate for real time applications, thus suitable for locating targets with mild mobility. As another example, certain embodiments are designed to work with multiple packets (e.g., as long as the channel condition over all these packets stays near constant, such as when the STA is stationary). Using multiple packets over the channel coherence time may improve the accuracy in identifying LOS vs. NLOS propagation conditions. As another example, certain embodiments of the proposed solution work for packets with both single user and multiple users. As another example, certain embodiments may determine a propagation condition without requiring any cooperation from the STA. The determination may be made based on analyzing phase and amplitude characteristics associated with signals that STAs send for other purposes (e.g., to transmit data), thus, the determination would be totally transparent to the STAs. Certain embodiments may include all, some, or none of these technical advantages. Other advantages will be understood by those of ordinary skill in the art.

Certain embodiments of the present disclosure may provide advantages compared to existing methods for identifying a LOS/NLOS propagation scenario. For example, existing methods try to recover the channel impulse response from one or multiple channel snapshots or to extract channel distribution information (amplitude or phase) through the accumulation of channel statistics over time. However, these methods often require a large signal bandwidth to ensure sufficient time resolution or a predefined probability model with a big data set to apply the hypothesis test, thus making such existing methods less feasible for use in real-time applications, such as the location determination procedure disclosed with respect to certain embodiments herein. By contrast, certain embodiments disclosed herein may be well-suited for real-time applications, such as location determination procedures, especially for locating wireless devices having low processing capability (such as IoT device in WiFi networks). For example, certain embodiments of the present disclosure consider the multipath channel features carried by the lower-level PHY (OFDM symbols) and provide techniques for calibrating and/or sanitizing phase information obtained from CSI in order to avoid using biased phase information.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A network node, operable to:
   obtain one or more packets that have been received over a wireless channel via a first antenna, wherein each packet comprises a plurality of time-frequency resources, each time-frequency resource corresponding to one of a plurality of orthogonal frequency division multiplexing (OFDM) symbols in a time domain and one of a plurality of subcarriers in a frequency domain;
   obtain raw data from the one or more packets, the raw data comprising a plurality of raw amplitude values and a plurality of raw phase values, each raw amplitude value and each raw phase value corresponding to a respective time-frequency resource;
   process the raw data according to an interference mitigation process that yields a plurality of calibrated amplitude values and a plurality of calibrated phase values;
   use the plurality of calibrated amplitude values and the plurality of calibrated phase values to determine a plurality of weighted phase values, each weighted phase value corresponding to a respective subcarrier;
   determine a phase variance for the first antenna, the phase variance based on comparing the plurality of weighted phase values across the plurality of subcarriers; and
   determine whether the wireless channel experiences line-of-sight propagation or non-line-of-sight propagation based at least in part on the phase variance of the first antenna.

2. The network node of claim 1, further comprising:
   determine a phase variance for each antenna of a plurality antennas, the plurality of antennas comprising the first antenna and one or more other antennas; and
   determine whether the wireless channel experiences the line-of-sight propagation or the non-line-of-sight propagation based on how many of the plurality of antennas have a phase variance that exceeds a threshold.

3. The network node of claim 1, wherein the one or more calibrated phase values and the one or more calibrated amplitude values used in determining the weighted phase value for the respective subcarrier are obtained from a single OFDM symbol.

4. The network node of claim 1, wherein the one or more calibrated phase values and the one or more calibrated amplitude values used in determining the weighted phase value for the respective subcarrier are obtained from a subset of OFDM symbols within the same packet of the one or more packets.

5. The network node of claim 1, wherein the one or more calibrated phase values and the one or more calibrated amplitude values used in determining the weighted phase value for the respective subcarrier are obtained from at least two of the packets.

6. The network node of claim 1, wherein the raw data is obtained using channel state information (CSI) and the network node is further operable to:
   for OFDM symbols that carry CSI, directly use the CSI carried by the OFDM symbols; and
   for OFDM symbols that do not carry CSI, derive the CSI from other information carried by the OFDM symbols.

7. The network node of claim 1, further operable to:
   provide a result of determining whether the wireless channel experiences the line-of-sight propagation or the non-line-of-sight propagation as an input to a location determination procedure.

8. A method comprising:
   obtaining one or more packets that have been received over a wireless channel via a first antenna, wherein each packet comprises a plurality of time-frequency resources, each time-frequency resource corresponding to one of a plurality of orthogonal frequency division multiplexing (OFDM) symbols in a time domain and one of a plurality of subcarriers in a frequency domain;
   obtaining raw data from the one or more packets, the raw data comprising a plurality of raw amplitude values and a plurality of raw phase values, each raw amplitude value and each raw phase value corresponding to a respective time-frequency resource;
   processing the raw data according to an interference mitigation process that yields a plurality of calibrated amplitude values and a plurality of calibrated phase values;
   using the plurality of calibrated amplitude values and the plurality of calibrated phase values to determine a plurality of weighted phase values, each weighted phase value corresponding to a respective subcarrier;
   determining a phase variance for the first antenna, the phase variance based on comparing the plurality of weighted phase values across the plurality of subcarriers; and
   determining whether the wireless channel experiences line-of-sight propagation or non-line-of-sight propagation based at least in part on the phase variance of the first antenna.

9. The method of claim 8, further comprising:
    determining a phase variance for each antenna of a plurality antennas, the plurality of antennas comprising the first antenna and one or more other antennas; and
    determining whether the wireless channel experiences the line-of-sight propagation or the non-line-of-sight propagation based on how many of the plurality of antennas have a phase variance that exceeds a threshold.

10. The method of claim 8, wherein the one or more calibrated phase values and the one or more calibrated amplitude values used in determining the weighted phase value for the respective subcarrier are obtained from a single OFDM symbol.

11. The method of claim 8, wherein the one or more calibrated phase values and the one or more calibrated amplitude values used in determining the weighted phase value for the respective subcarrier are obtained from a subset of OFDM symbols within the same packet of the one or more packets.

12. The method of claim 8, wherein the one or more calibrated phase values and the one or more calibrated amplitude values used in determining the weighted phase value for the respective subcarrier are obtained from at least two of the packets.

13. The method of claim 8, wherein the raw data is obtained using channel state information (CSI) and the method further comprises:
    for OFDM symbols that carry CSI, directly using the CSI carried by the OFDM symbols;
    for OFDM symbols that do not carry CSI, deriving the CSI from other information carried by the OFDM symbols.

14. The method of claim 8, further comprising:
    providing a result of determining whether the wireless channel experiences the line-of-sight propagation or the non-line-of-sight propagation as an input to a location determination procedure.

15. A non-transitory computer readable medium comprising logic that, when executed by processing circuitry of a network node, causes the network node to perform actions comprising:
    obtaining one or more packets that have been received over a wireless channel via a first antenna, wherein each packet comprises a plurality of time-frequency resources, each time-frequency resource corresponding to one of a plurality of orthogonal frequency division multiplexing (OFDM) symbols in a time domain and one of a plurality of subcarriers in a frequency domain;
    obtaining raw data from the one or more packets, the raw data comprising a plurality of raw amplitude values and a plurality of raw phase values, each raw amplitude value and each raw phase value corresponding to a respective time-frequency resource;
    processing the raw data according to an interference mitigation process that yields a plurality of calibrated amplitude values and a plurality of calibrated phase values;
    using the plurality of calibrated amplitude values and the plurality of calibrated phase values to determine a plurality of weighted phase values, each weighted phase value corresponding to a respective subcarrier;
    determining a phase variance for the first antenna, the phase variance based on comparing the plurality of weighted phase values across the plurality of subcarriers; and
    determining whether the wireless channel experiences line-of-sight propagation or non-line-of-sight propagation based at least in part on the phase variance of the first antenna.

16. The non-transitory computer readable medium of claim 15, wherein the logic, when executed by the processing circuitry of the network node, further causes the network node to perform actions comprising:
    determining a phase variance for each antenna of a plurality antennas, the plurality of antennas comprising the first antenna and one or more other antennas; and
    determining whether the wireless channel experiences the line-of-sight propagation or the non-line-of-sight propagation based on how many of the plurality of antennas have a phase variance that exceeds a threshold.

17. The non-transitory computer readable medium of claim 15, wherein the one or more calibrated phase values and the one or more calibrated amplitude values used in determining the weighted phase value for the respective subcarrier are obtained from a single OFDM symbol.

18. The non-transitory computer readable medium of claim 15, wherein the one or more calibrated phase values and the one or more calibrated amplitude values used in determining the weighted phase value for the respective subcarrier are obtained from a subset of OFDM symbols within the same packet of the one or more packets.

19. The non-transitory computer readable medium of claim 15, wherein the one or more calibrated phase values and the one or more calibrated amplitude values used in determining the weighted phase value for the respective subcarrier are obtained from at least two of the packets.

20. The non-transitory computer readable medium of claim 15, wherein the logic, when executed by the processing circuitry of the network node, further causes the network node to perform actions comprising:
    providing a result of determining whether the wireless channel experiences the line-of-sight propagation or the non-line-of-sight propagation as an input to a location determination procedure.

* * * * *